(12) United States Patent
Horton et al.

(10) Patent No.: US 12,362,966 B2
(45) Date of Patent: Jul. 15, 2025

(54) ENABLING VIRTUAL PRIVATE NETWORK (VPN) SUPPORT IN A VIRTUALIZED ENVIRONMENT

(71) Applicant: MICROSOFT TECHNOLOGY LICENSING, LLC, Redmond, WA (US)

(72) Inventors: Keith Edgar Horton, North Bend, WA (US); Alan Thomas Gavin Jowett, Eagle MT, UT (US); Andrew Mario Beltrano, Colorado Springs, CO (US); Catalin-Emil Fetoiu, Redmond, WA (US); Guillaume Philippe Adrien Hetier, Redmond, WA (US); Matthew Yutaka Ige, Seattle, WA (US); Mitchell James Schmidt, Bellevue, WA (US); Randy Joseph Miller, Newcastle, WA (US)

(73) Assignee: MICROSOFT TECHNOLOGY LICENSING, LLC, Redmond, WA (US)

( * ) Notice: Subject to any disclaimer, the term of this patent is extended or adjusted under 35 U.S.C. 154(b) by 0 days.

(21) Appl. No.: 18/056,668

(22) Filed: Nov. 17, 2022

(65) Prior Publication Data

US 2023/0370306 A1 Nov. 16, 2023

Related U.S. Application Data

(60) Provisional application No. 63/342,600, filed on May 16, 2022.

(51) Int. Cl.
*G06F 15/16* (2006.01)
*G06F 9/455* (2018.01)
*H04L 12/46* (2006.01)

(52) U.S. Cl.
CPC ...... *H04L 12/4633* (2013.01); *G06F 9/45558* (2013.01); *H04L 12/4641* (2013.01); *G06F 2009/45595* (2013.01)

(58) Field of Classification Search
None
See application file for complete search history.

(56) References Cited

U.S. PATENT DOCUMENTS

| | | | |
|---|---|---|---|
| 6,711,162 B1 | 3/2004 | Ortega et al. | |
| 7,478,173 B1 * | 1/2009 | Delco | H04L 61/103 709/250 |

(Continued)

FOREIGN PATENT DOCUMENTS

WO    2006012612 A1    2/2006

OTHER PUBLICATIONS

"VM Shae host's VPN connection", https://superuser.com/questions/842489/vm-share-hosts-vpn-connection (Year: 2014).*

(Continued)

*Primary Examiner* — Nicholas R Taylor
*Assistant Examiner* — Ho T Shiu
(74) *Attorney, Agent, or Firm* — Newport IP, LLC; Jacob P. Rohwer

(57) ABSTRACT

Technologies are disclosed for enabling virtual private network (VPN) support in a virtualized environment. The presence or creation of a host VPN adapter on a host processing system providing a virtualized environment is detected and, in response thereto, a virtual network adapter is created in the virtualized environment. A guest operating system (OS) creates a guest VPN adapter in the virtualized environment. A software component is inserted between the guest VPN adapter and the virtual network adapter. The software component adds Ethernet frames to point-to-point protocol (PPP) packets received from the guest VPN adapter (Continued)

and removes Ethernet frames from packets received from the virtual network adapter.

20 Claims, 6 Drawing Sheets

(56) References Cited

U.S. PATENT DOCUMENTS

| | | | |
|---|---|---|---|
| 2002/0046348 A1* | 4/2002 | Brustoloni | H04L 63/164 |
| | | | 726/6 |
| 2002/0112076 A1 | 8/2002 | Rueda et al. | |
| 2012/0023507 A1* | 1/2012 | Travis | G06F 9/45537 |
| | | | 718/1 |
| 2012/0163388 A1* | 6/2012 | Goel | H04L 12/4641 |
| | | | 370/395.53 |
| 2013/0133061 A1* | 5/2013 | Fainkichen | G06F 9/45529 |
| | | | 726/15 |
| 2014/0059544 A1* | 2/2014 | Koganty | G06F 9/45533 |
| | | | 718/1 |
| 2014/0310389 A1* | 10/2014 | Lee | H04L 41/00 |
| | | | 709/223 |
| 2018/0167268 A1 | 6/2018 | Liguori et al. | |
| 2019/0132291 A1* | 5/2019 | Zhao | G06F 9/45558 |
| 2021/0132973 A1* | 5/2021 | Nair | H04L 61/3025 |
| 2021/0320819 A1 | 10/2021 | Chen | |

OTHER PUBLICATIONS

"International Search Report and Written Opinion Issued in PCT Application No. PCT/US23/015837", Mailed Date: Jun. 20, 2023, 11 Pages. (MS# 411828-WO-PCT).

Carrel, et al., "A Method for Transmitting PPP Over Ethernet (PPPoE)", Retrieved from: https://datatracker.ietf.org/doc/rfc2516/, Feb. 1999, 17 Pages.

U.S. Appl. No. 63/432,600, filed May 16, 2022.

* cited by examiner

TRANSLATION OF NETWORK PACKETS ORIGINATING IN
VIRTUALIZED ENVIRONMENT

ENABLING VIRTUAL PRIVATE NETWORK (VPN) SUPPORT IN A VIRTUALIZED ENVIRONMENT

CROSS-REFERENCE TO RELATED APPLICATIONS

This application claims the benefit of U.S. Provisional Patent Application No. 63/342,600, entitled "Enabling VPN Support in a Virtualized Environment," which was filed on May 16, 2022, and which is expressly incorporated herein by reference in its entirety.

BACKGROUND

Virtualization technologies enable the creation of an abstraction layer over physical hardware that allows a single computer, commonly referred to as a "host," to provide multiple isolated virtualized environments, commonly referred to as "guests," that executes an operating system ("OS") and other program components independently from the host. Examples of virtualized environments include virtual machines ("VMs") and containers.

In order for program components executing in a virtualized environment to execute correctly without modification, resources utilized by the program components need to be provided in the guest in the manner expected by the program components. For instance, some applications executing in a guest utilize network resources, such as virtual private networks ("VPNs"). In order to function properly without modification, these applications need to be able to access the network resources in the same manner they would if they were executing directly on the platform for which they were originally developed.

Providing network resources, such as VPNs, in the manner expected by program components executing in virtualized environments is, however, very difficult. This is particularly true when there is no one-to-one mapping between network resources provided by the host and those expected by the guest. Providing network resources in the manner expected by program components executing in virtualized environments is also difficult when the OS executing on the host exposes network resources to program components in a different manner than the OS executing in the guest.

SUMMARY

Technologies are disclosed herein for enabling VPN support in a virtualized environment. Through implementations of the disclosed technologies, support for VPNs is provided in the manner expected by program components executing in a virtualized environment, which enables the program components to communicate over VPNs connected to a host without modification. Other technical benefits not specifically mentioned herein might also be realized through implementations of the disclosed subject matter.

In order to provide aspects of the functionality disclosed herein, the presence or creation of a host VPN adapter on a host processing system providing a virtualized environment is detected. In an embodiment, a virtual network adapter is created in the virtualized environment responsive to detecting the presence or creation of the host VPN adapter. In an embodiment, the virtual network adapter is a virtual Ethernet adapter. As will be described in greater detail below, the virtual network adapter in the virtualized environment is utilized to mirror the host VPN adapter.

In an embodiment, a guest operating system creates a guest VPN adapter in the virtualized environment. A software component, referred to herein as a "VPN bridge," is then inserted between the guest VPN adapter and the virtual network adapter. As will be described in greater detail below, the VPN bridge adds Ethernet frames to point-to-point protocol ("PPP") packets received from the guest VPN adapter. The VPN bridge also removes Ethernet frames from packets received from the virtual network adapter. In this manner, applications and other program components executing in the virtualized environment communicate over a VPN connected to the host processing system without modification.

In an embodiment, a first software component, referred to herein as the "guest network service ("GNS") proxy," executing on the host processing system detects the presence or creation of the host VPN adapter on the host processing system. The GNS proxy detects the host VPN adapter using heuristics in an embodiment.

In response to detecting the host VPN adapter, the GNS proxy also generates a notification to a second software component, referred to herein as the "guest network service ("GNS") daemon," executing in the virtualized environment. In an embodiment, the GNS proxy also creates the virtual network adapter in the virtualized environment responsive to detecting the host VPN adapter.

In an embodiment, the GNS daemon receives the notification from the GNS proxy and, in response thereto, causes the guest OS executing in the virtualized environment to create the guest VPN adapter. In an embodiment, the GNS daemon also inserts the VPN bridge between the guest VPN adapter and the virtual network adapter.

The above-described subject matter is implemented as a computer-controlled apparatus, a computer-implemented method, a computing device, or as an article of manufacture such as a computer readable medium in various embodiments disclosed herein. These and various other features will be apparent from a reading of the following Detailed Description and a review of the associated drawings.

This Summary is provided to introduce a brief description of some aspects of the disclosed technologies in a simplified form that are further described below in the Detailed Description. This Summary is not intended to identify key features or essential features of the claimed subject matter, nor is it intended that this Summary be used to limit the scope of the claimed subject matter. Furthermore, the claimed subject matter is not limited to implementations that solve any or all disadvantages noted in any part of this disclosure.

DETAILED DESCRIPTION

Figure 1:
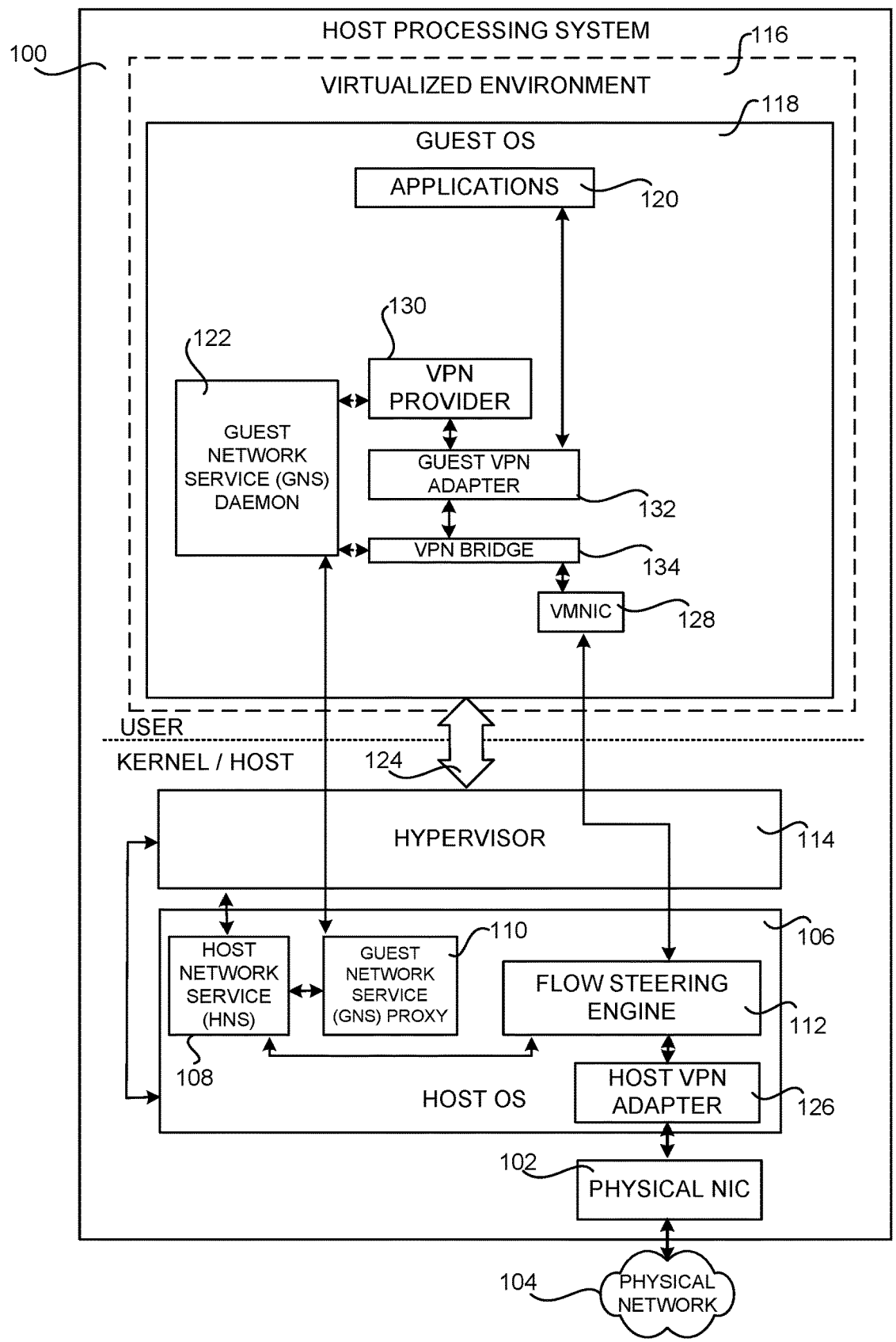
FIG. 1 is a computing system architecture diagram showing aspects of an example mechanism disclosed herein for enabling VPN support in a virtualized environment, according to an embodiment.

The following detailed description is directed to technologies for enabling VPN support in a virtualized environment. As discussed briefly above, various technical benefits are realized through implementations of the disclosed technologies, such as enabling VPN support for program components executing in a virtualized environment in a manner that enables the program components to execute without modification. Thereby, program components in a virtualized environment access and utilize VPNs in the same manner they would if they were executing directly on the platform for which they were originally developed.

As discussed briefly above, virtualization technologies enable the creation of an abstraction layer over physical hardware that allows a single computer, commonly referred to as a "host," to provide multiple isolated virtualized environments, commonly referred to as "guests," that execute an OS and other programs independently from the host, in an embodiment. Examples of virtualized environments include VMs and containers.

In virtualized environments, guests commonly execute an isolated OS (the "guest OS") that is fully independent of the OS executing on the host (the "host OS"). This creates a deployment where applications and other program components deployed into the guest run in the OS environment for which they were originally designed, regardless of the host OS. This also allows program components executing in a guest to appear to a user as if they were running on the host directly. Program components are executable programs, such as applications and components of a guest OS.

In one specific example, for instance, a host executing one OS, such as the WINDOWS® OS, might be configured to provide a virtualized environment, such as a container or a VM, that executes a different OS, such as the ANDROID™ OS. In this example, applications and other program components executing in the virtualized environment have access to a runtime environment that is the same as if they were executing directly on a physical device. These program components, therefore, execute in the virtualized environment without modification. At the same time, a user of the host utilizes the program components as if they were running directly on the host.

In order for program components executing in a virtualized environment such as that described above to execute correctly without modification, resources utilized by the program components need to be provided in the virtualized environment in the manner expected by the program components. For instance, some program components executing in a virtualized environment utilize network resources, such as VPNs. In order to function properly without modification, these program components need to be able to access the required network resources in the same manner they would if they were executing directly on the platform for which they were originally developed.

Provision of network resources in a virtualized environment in the manner expected by program components executing in the guest, however, is very difficult. This is particularly true when the host OS exposes network resources to program components in a different manner than the guest OS. For example, a host OS might utilize a different implementation for objects utilized by program components to access a VPN than a guest OS.

FIG. 1 is a computing system architecture diagram showing aspects of an example mechanism disclosed herein for enabling VPN support in a virtualized environment, according to an embodiment. In particular, FIG. 1 shows aspects of the configuration and operation of a host processing system 100 (referred to herein as the "host 100") configured to provide a virtualized environment 116, such as a VM or a container.

Figure 4:
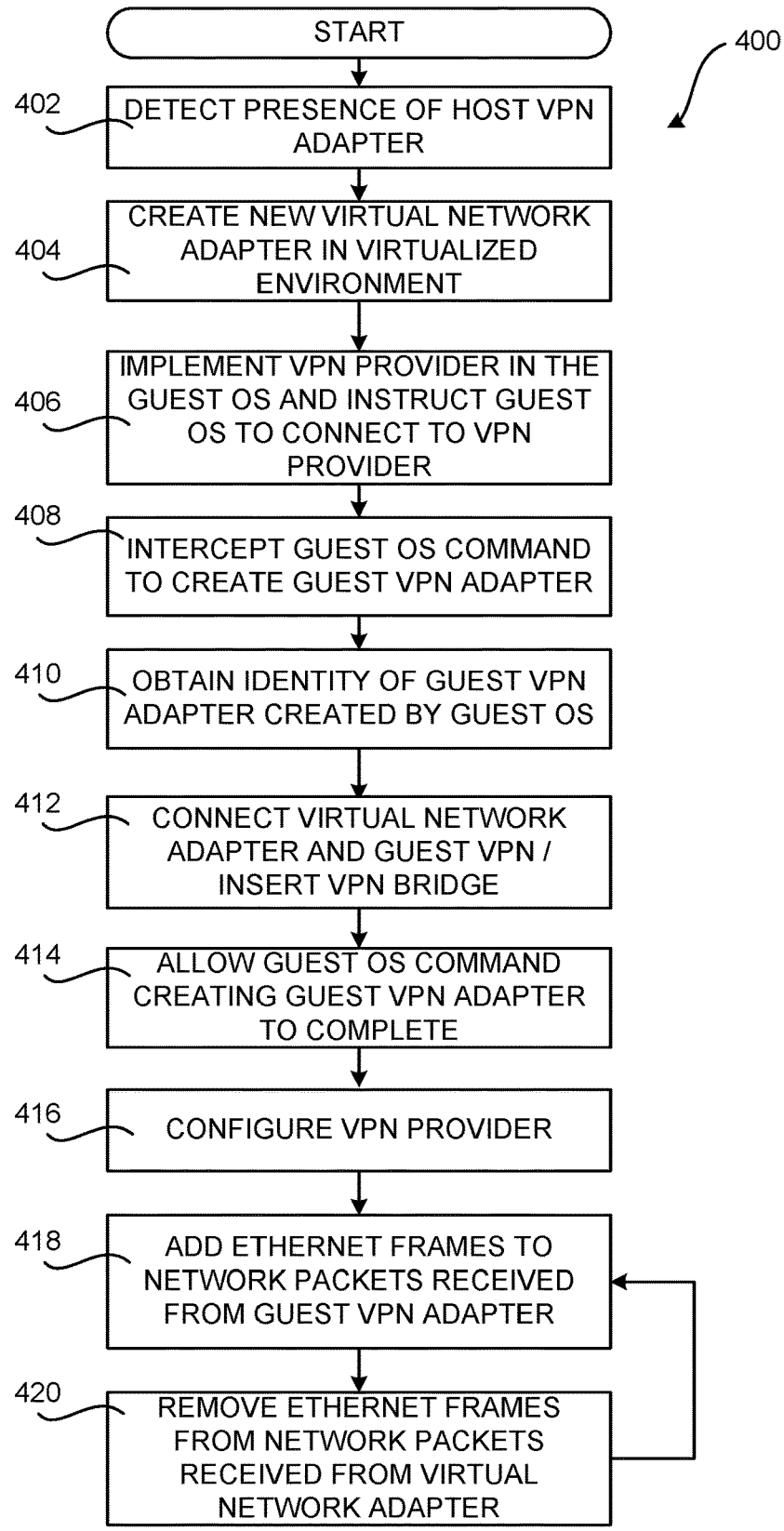
FIG. 4 is a flow diagram showing a routine that illustrates aspects of the example mechanism shown in FIGS. 1-3 for enabling VPN support in a virtualized environment, according to an embodiment.

In order to provide the disclosed functionality, the host 100 includes various hardware devices, some of which are not illustrated in FIG. 1 for simplicity, including a physical network interface card ("NIC") 102 (referred to herein as a "network interface"). The network interface 102 is a hardware device that provides media access to a physical network 104, such as a wired or wireless local area network, the internet, or a cellular network. Although a single network interface 102 is illustrated in FIG. 1, the host 100 might include other numbers of network interfaces 102 in other examples. FIG. 4, described below, provides additional detail regarding some of the other hardware components that might be present in the host 100.

A host network stack (not shown in FIG. 1) handles network communications passing between the host 100 and the physical network 104 via the network interface 102. The host network stack typically includes appropriate layers of the Open Systems Interconnection ("OSI") model.

As also shown in FIG. 1 and described briefly above, the host 100 executes a host OS 106. In an embodiment, the host OS 106 is a member of the WINDOWS® family of operating systems from MICROSOFT® CORPORATION. Other operating systems from other developers might be utilized as the host OS 106 in other embodiments.

The host 100 also executes a hypervisor 114, in some embodiments. The hypervisor 114 is a software component that virtualizes hardware access for virtualized environments 116, such as VMs and containers. The term "hypervisor," as used herein, is considered to include privileged host-side virtualization functionality commonly found in privileged partitions or hardware isolated virtualized environments.

Virtual machine managers ("VMMs"), container engines, and kernel-based virtualization modules are some examples of hypervisors. The technologies disclosed herein might be utilized with other types of solutions for providing isolated access to virtualized hardware to a virtualized environment 116.

In the embodiment illustrated in FIG. 1, the hypervisor 114 provides support for one or more virtualized environments 116. In an embodiment, the virtualized environment 116 is a container, which is a unit of software that holds the necessary components—code, runtime, system tools, system libraries, and software dependencies, among others—for an application to run easily across different computing environments, i.e., any computer hardware, infrastructure, or cloud environment.

In an embodiment, the virtualized environment 116 is a VM, which is a compute resource that uses software instead of a physical computer to run programs and deploy applications. The virtualized environment 116 is a hardware isolated virtualized environment, in other embodiments. A guest-host communication channel 124, such as a socket-based interface, is established between the host 100 and the virtualized environment 116 to enable network communication between a guest OS 118 and the host OS 106 in some embodiments.

As shown in FIG. 1, and described briefly above, a guest OS 118 is executed in the virtualized environment 116, in an embodiment. In an embodiment, the guest OS 118 is a different OS than the host OS 106. The guest OS 118 includes a complete OS kernel executing fully independently of the kernel of the host OS 106, in some embodiments.

Through virtualization, the guest OS 118 and other program components executing on the guest OS 118, such as the applications 120, execute in the virtualized environment 116 in the same manner they would if they were executing directly on the host 100 (e.g., executing directly on the host OS 106). The guest OS 118 and other program components executing on the guest OS 118, such as the applications 120, are generally unaware that they are not executing directly on physical hardware.

In an embodiment, the guest OS 118 is the ANDROID™ OS developed by the OPEN HANDSET ALLIANCE™ and commercially sponsored by GOOGLE® LLC. The ANDROID™ OS is a mobile OS based on a modified version of the LINUX® kernel and other open source software and has been designed primarily for touchscreen mobile devices such as smartphones and tablet computing devices.

In another embodiment, the guest OS 118 is the TIZEN™ OS backed by the LINUX FOUNDATION™ and mainly developed and utilized by SAMSUNG® ELECTRONICS CO., LTD. Other operating systems from other developers might be utilized as the guest OS 118 in other embodiments.

As discussed briefly above, various challenges arise when attempting to provide network resources to a guest OS 118 and other program components executing in a virtualized environment 116. This is particularly true when there is not a one-to-one mapping between network resources provided by the host 100 and those expected by the program components executing in the virtualized environment 116, and where host OS 106 exposes network resources in a different manner than the guest OS 118. For example, the host OS 106 might utilize a different implementation than the guest OS 118 for objects utilized by program components to access a VPN.

In order to address the technical problems described briefly above, and potentially other technical problems, a program component executing on the host 100 detects the presence or creation of a host VPN adapter 126. A host VPN adapter 126 is a virtual network interface usable by program components executing on the host 100 to access a VPN. A VPN extends a private network across a public network, such as the network 104, and enables a processing system to send and receive data across the public network as if it were directly connected to the private network.

In an embodiment, a GNS proxy 110 is configured to detect the presence or creation of a host VPN adapter 126. The GNS proxy 110 is a software component executing on the host OS 106 that is configured to detect the presence or creation of a host VPN adapter 126 and to generate a notification to a program component executing in the virtualized environment 118 that a host VPN adapter 126 is present or that creation of a host VPN adapter 126 has occurred.

In an embodiment, the GNS proxy 110 utilizes heuristics to detect the host VPN adapter 126. For example, when the host OS 106 is a member of the WINDOWS® family of operating systems from MICROSOFT® CORPORATION, a well-defined signal indicating the creation or presence of a host VPN adapter 126 might not be available. In this embodiment, the GNS proxy 110 utilizes heuristics to detect the creation of a host VPN adapter 126. Such heuristics include determining whether a host adapter is functioning in the manner that a host VPN adapter 126 is expected to function and the properties associated with a host adapter, such as the name utilized by a driver to describe the host adapter.

When the GNS proxy 110 determines that a host VPN adapter 126 is present or has been created, the GNS proxy 110 provides a notification to a GNS daemon 122 executing in the virtualized environment 116. The GNS daemon 122 is a software component (e.g., a daemon) that receives notifications of the creation of a host VPN adapter 126 from the GNS proxy 110 and configures the virtualized environment 116 such that program components executing in the virtualized environment utilize the host VPN adapter 126 to communicate on a VPN, in an embodiment. Additional details regarding the configuration and operation of the GNS proxy 110 and the GNS daemon 122 will be provided below.

When the GNS proxy 110 detects the presence or creation of a host VPN adapter 126, the GNS proxy 110 also causes a virtual adapter 128 to be created in the virtualized environment 116 for use in mirroring the host VPN adapter 126 in the manner described below. The virtual adapter 128 is a virtual Ethernet adapter, in an embodiment, but might be another type of virtual network interface in other embodiments. The GNS proxy 110 obtains information about the host VPN adapter 126 for use in creating the virtual adapter 128 from a host network service 108 in an embodiment.

As discussed briefly above, when a host VPN adapter 126 is detected, the GNS proxy 110 on the host 100 also notifies the GNS daemon 122 that the virtual adapter 128 has been created for passing VPN traffic between the virtualized environment 116 and the host 100. In response thereto, the GNS proxy 110 utilizes functionality provided by the guest OS 118 to request that the guest OS 118 create a new VPN connection. For example, application programming interfaces ("APIs") exposed by the guest OS 118 might be utilized to request the creation of a new VPN connection in the virtualized environment 116.

In response to receiving the request, the guest OS 118 communicates with a VPN provider 130, in an embodiment. The VPN provider 130 provides instructions to the guest OS 118 for use in creating the requested VPN connection. In turn, the guest OS 118 implements the creation of the guest VPN adapter 132 as instructed by the VPN provider 130. The guest VPN adapter 132 is a virtual network adapter that program components executing on the guest OS 118 use to access a VPN.

The guest OS 118 then informs applications 120 that the VPN connection has been created. Thereafter, the applications 120 utilize the guest VPN adapter 132 to access the VPN, in an embodiment. In an embodiment where the guest OS 118 is the ANDROID™ OS, the VPN provider 130 is a LINUX® tunnel adapter. Other types of VPN providers 130 might be instantiated by other types of guest operating systems in other embodiments.

In an embodiment, the GNS daemon 122 intercepts one or more calls made by the guest OS 118 when creating the guest VPN adapter 132. In this manner, the GNS daemon 122 temporarily prevents the creation of the guest VPN adapter 132 from completing, according to an embodiment. During this time period, the GNS daemon 122 locates the guest VPN adapter 132 and inserts a software component, referred to herein as the "VPN bridge 134," between the new guest VPN adapter 132 and the virtual adapter 128 configured mirror the host VPN adapter 126 in the manner described above. Once the GNS daemon 122 has inserted the VPN bridge 134 between the guest VPN adapter 132 and the virtual adapter 128, the GNS daemon 122 allows the creation of the guest VPN adapter 132 by the guest OS 118 to complete.

Once the configuration described above has been established, point-to-point protocol ("PPP") packets are routed from applications 120 executing in the virtualized environment 116 to the host VPN adapter 126 and out to the network 104, in an embodiment. Similarly, PPP packets received via the network 104 at the host VPN adapter 126 that are destined for the virtualized environment 116 are properly routed to their destination, in an embodiment.

PPP is a data link layer (OSI Layer 2) communication protocol between two routers directly without any host or any other networking in between. PPP provides connection authentication, transmission encryption, and data compression. PPP packets are network packets constructed in accordance with the PPP.

In an embodiment, PPP packets originating in and destined for the virtualized environment 116 are routed through the guest-host communication channel 124, the hypervisor 114, and a flow steering engine ("FSE") 112. The FSE 112 is a software component configured to route network packets to and from the virtualized environment 116 through a virtual switch (not shown in FIG. 1) connected to the virtualized environment 116.

The FSE 112 is an OS driver, in an embodiment, but might be implemented as another type of component in other embodiments. For instance, the FSE 112 is implemented as part of a Transmission Control Protocol ("TCP") or User Datagram Protocol ("UDP") module, as a shim or filter between the transport layer and another layer of the host network stack, or in another manner.

In an embodiment, the FSE 112 routes packets to and from the virtualized environment 116 by determining which packets are destined for the host OS 106 and which are destined for the virtualized environment 116 by tracking unique OSI Layer 4 identifiers, such as TCP and UDP port numbers. In this manner, the guest OS 118 executes without modification of its network stack, in an embodiment. The host OS 106 largely has an unmodified network stack (e.g., only the FSE 112 is added to the network stack of the host OS 118), in an embodiment.

In order to facilitate transmission of PPP packets through the virtual adapter 128, the guest-host communication channel 124, the hypervisor 114, and the FSE 112, the VPN bridge 134 is configured to add Ethernet frames to PPP packets originating in the virtualized environment 116 prior to providing the packets to the virtual adapter 128. The VPN bridge 134 is also configured to remove Ethernet frames from network packets received from the virtual adapter 128 and destined for the virtualized environment 116.

Additional details regarding the manner in which PPP packets are routed from program components executing in the virtualized environment 116 to the host VPN adapter 126 are provided below with respect to FIG. 2. Additional details regarding the manner in which PPP packets are routed from the host VPN adapter 126 to a destination program component executing in the virtualized environment 116 are provided below with respect to FIG. 3.

Figure 2:
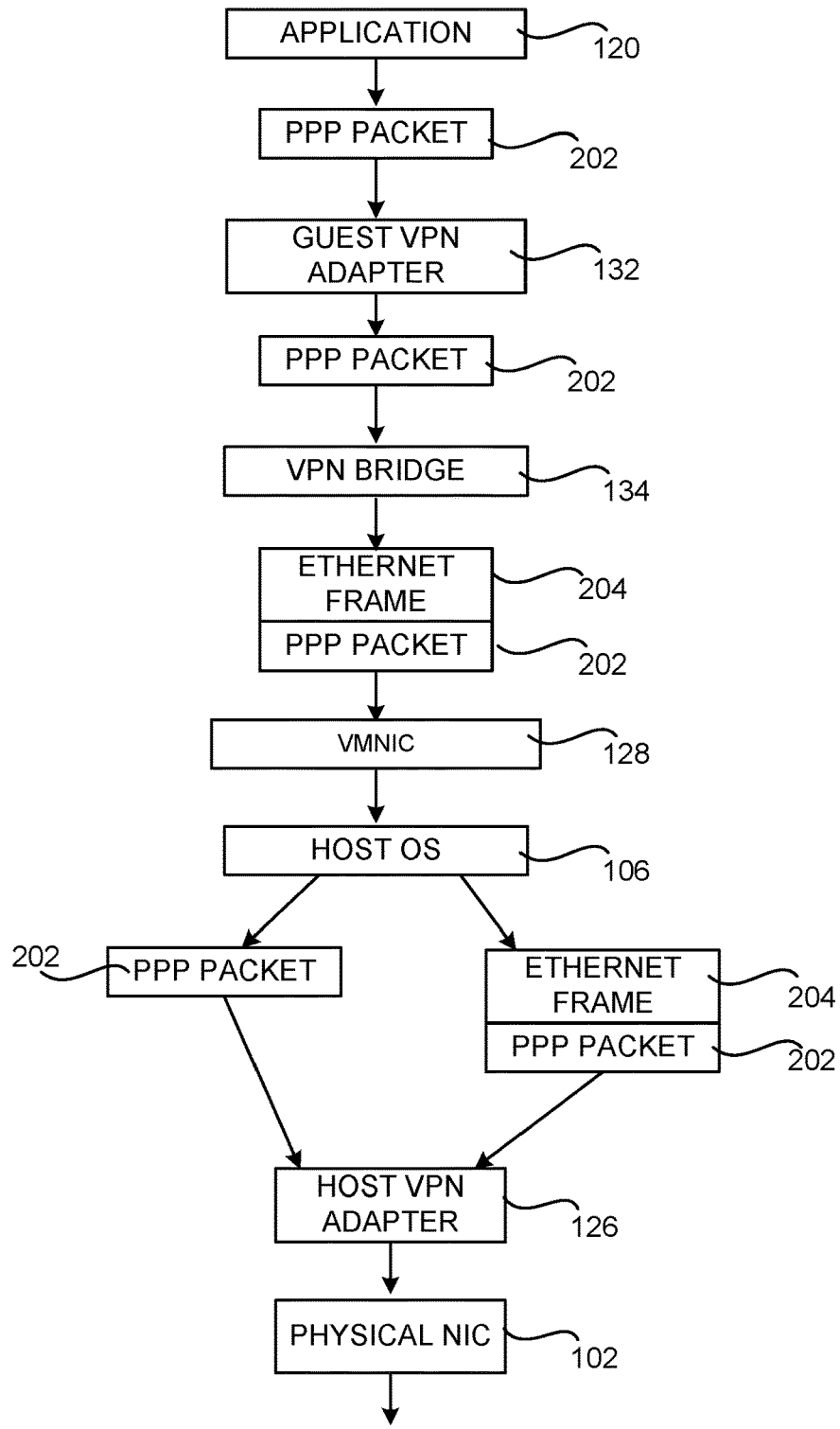
FIG. 2 is a data flow diagram showing additional aspects of the example mechanism shown in FIG. 1 relating to routing network packets originating in a virtualized environment, according to an embodiment.

FIG. 2 is a data flow diagram showing additional aspects of the example mechanism shown in FIG. 1 relating to the routing of PPP packets originating in a virtualized environment 116, according to an embodiment. As shown in FIG. 2, a PPP packet 202 originating at an application 120 or another type of program component executing in the virtualized environment 116 is provided to the guest VPN adapter 132.

The guest VPN adapter 132 typically provides the PPP packet 202 to the virtual adapter 128. However, utilizing the mechanism described above with regard to FIG. 1, the VPN bridge 134 intercepts the PPP packet 202 before the PPP packet 202 reaches the virtual adapter 128. The VPN bridge 134 adds an Ethernet frame 204 to the PPP packet 202. The VPN bridge 134 then forwards the resulting packet to the virtual adapter 128 that is mirrored to the host VPN adapter 126 on the host 100.

The virtual adapter 128 transmits PPP packets 202 having Ethernet frames 204 received from the VPN bridge 134 to the host OS 106 in the manner described above. In an embodiment, the host OS 106 removes the Ethernet frame 204 from the received PPP packet 202 and forwards the PPP packet 202 to the host VPN adapter 126. In another embodiment, the host OS 106 does not remove the Ethernet frame 204 prior to transmitting the PPP packet 202 to the host VPN adapter 126. The host VPN adapter 126, in turn, forwards the forwards the PPP packet 202 to the network interface 102 for transmission to a destination endpoint on the network 104.

Figure 3:
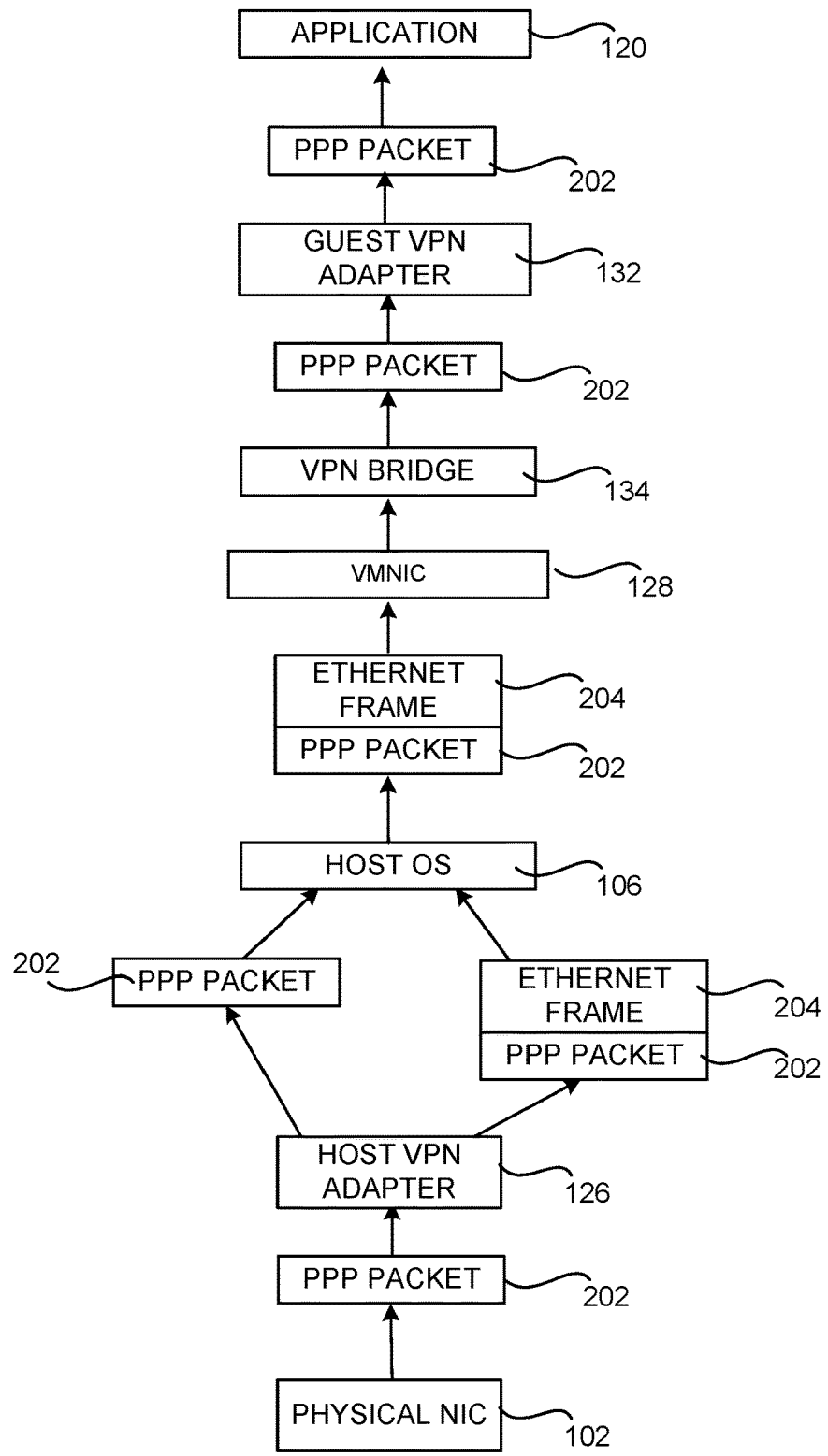
FIG. 3 is a data flow diagram showing additional aspects of the example mechanism shown in FIG. 1 relating to routing network packets destined for a virtualized environment, according to an embodiment.

FIG. 3 is a data flow diagram showing additional aspects of the example mechanism shown in FIG. 1 relating to the routing of PPP packets 202 destined for a virtualized environment 116, according to an embodiment. As shown in FIG. 3, a PPP packet 202 received at the host VPN adapter 126 on the host 100 is provided to the host OS 100. In an embodiment, the host VPN adapter 126 provides a PPP packet 202 without an Ethernet frame 204 to the host OS 106. In this embodiment, the host OS 100 adds an Ethernet frame 204 to the PPP packet 202 and forwards the resulting packet to the virtual adapter 128.

In another embodiment, the host VPN adapter 126 provides a PPP packet 202 having an Ethernet frame 204 to the host OS 106. In this embodiment, it is not necessary for the host OS 100 to add an Ethernet frame 204 to the PPP packet 202 prior to forwarding the packet to the virtual adapter 128.

The virtual adapter 128, in turn, forwards the packets received from the host OS 106 to the VPN bridge 134. As discussed above, the VPN bridge 134 strips the Ethernet frame 204 from the packet to obtain the PPP packet 202. The VPN bridge 134 then provides the PPP packet 202 to the guest VPN adapter 132 which, in turn, forwards data from the PPP packet 202 to the destination application 120 or other program component executing in the virtualized environment 116.

FIG. 4 is a flow diagram showing a routine 400 that illustrates aspects of the example mechanism shown in FIGS. 1-3 for enabling VPN support in a virtualized environment 116, according to an embodiment. The routine 400 begins at operation 402, where a program component executing on the host OS 106 detects the presence or creation of a host VPN adapter 126 on the host 100. As discussed above, the GNS proxy 110 provides this functionality in an embodiment. Other components might provide this functionality in other embodiments.

In response to detecting the presence or creation of a host VPN adapter 126, the routine 400 proceeds from operation 402 to operation 404, where the GNS proxy 110 causes a new virtual adapter 128 to be created in the virtualized environment 116 for mirroring the host VPN adapter 126. As discussed above, the virtual adapter 128 is a virtual Ethernet adapter in an embodiment. The virtual adapter 128 might be another type of virtual network adapter in other embodiments. The routine 400 then proceeds from operation 404 to operation 406.

At operation 406, the GNS proxy 110 utilizes functionality provided by the guest OS 118 to request that the guest OS 118 create a new VPN connection in the manner described above with regard to FIG. 1. As discussed above, in response to receiving the request, the guest OS 118 instantiates a VPN provider 130. The GNS proxy 110 also instructs the guest OS 118 to connect to the newly created VPN provider 130. In an embodiment where the guest OS 118 is the ANDROID' OS, the VPN provider 130 is a LINUX® tunnel adapter. Other types of VPN providers 130 are instantiated by other types of guest operating systems in other embodiments.

From operation 406, the routine 400 proceeds to operation 408, where the GNS proxy 110 intercepts one or more commands made by the guest OS 118 when creating the guest VPN adapter 132. As discussed above, this enables the GNS daemon 122 to temporarily prevent the creation of the guest VPN adapter 132 from completing.

From operation 408, the routine 400 proceeds to operation 410, where the GNS daemon 122 obtains the identity of the guest VPN adapter 132 created by the guest OS 118. The routine 400 then proceeds from operation 410 to operation 412, where the GNS daemon 122 instantiates the VPN bridge 134 and establishes connections between the guest VPN adapter 132, the VPN bridge 134, and the virtual adapter 128 in the manner shown in FIG. 1. Once these connections have been established, the routine 400 proceeds to operation 444, where the GNS daemon 122 allows the command for creating the guest VPN adapter 132 by the guest OS 118 to complete. The routine 400 then proceeds from operation 414 to operation 416.

At operation 416, the VPN provider 130 in the virtualized environment 116 is configured (e.g., setting IP addresses) for communication with the host 100. At this point, the virtualized environment 116 has been configured to enable VPN traffic to flow from the virtualized environment 116 to the host 100 and from the host 100 to the virtualized environment 116. In this regard, it is to be appreciated that the configuration described above takes place in a manner that is transparent to the guest OS 118 and applications 120 and other program components executing thereupon. In this way, applications 120 do not need to be modified to transmit and receive VPN traffic when executing in the virtualized environment 116.

From operation 416, the routine 400 proceeds to operation 418, where the VPN bridge 134 adds Ethernet frames 204 to PPP packets 202 originating in the virtualized environment 116. At operation 420, the VPN bridge 134 removes Ethernet frames 204 from PPP packets 202 originating at the host VPN adapter 126 and destined for the virtualized environment 116. The operations 418 and 420 continue while the host VPN adapter 126 is present. If the GNS proxy 110 determines that the host VPN adapter 126 is no longer present, the virtualized environment 116 is returned to its original configuration, in an embodiment. For example, the virtual adapter 128, VPN bridge 134, guest VPN adapter 132, and VPN provider 130 are removed from the virtualized environment 116, in an embodiment.

Figure 5:
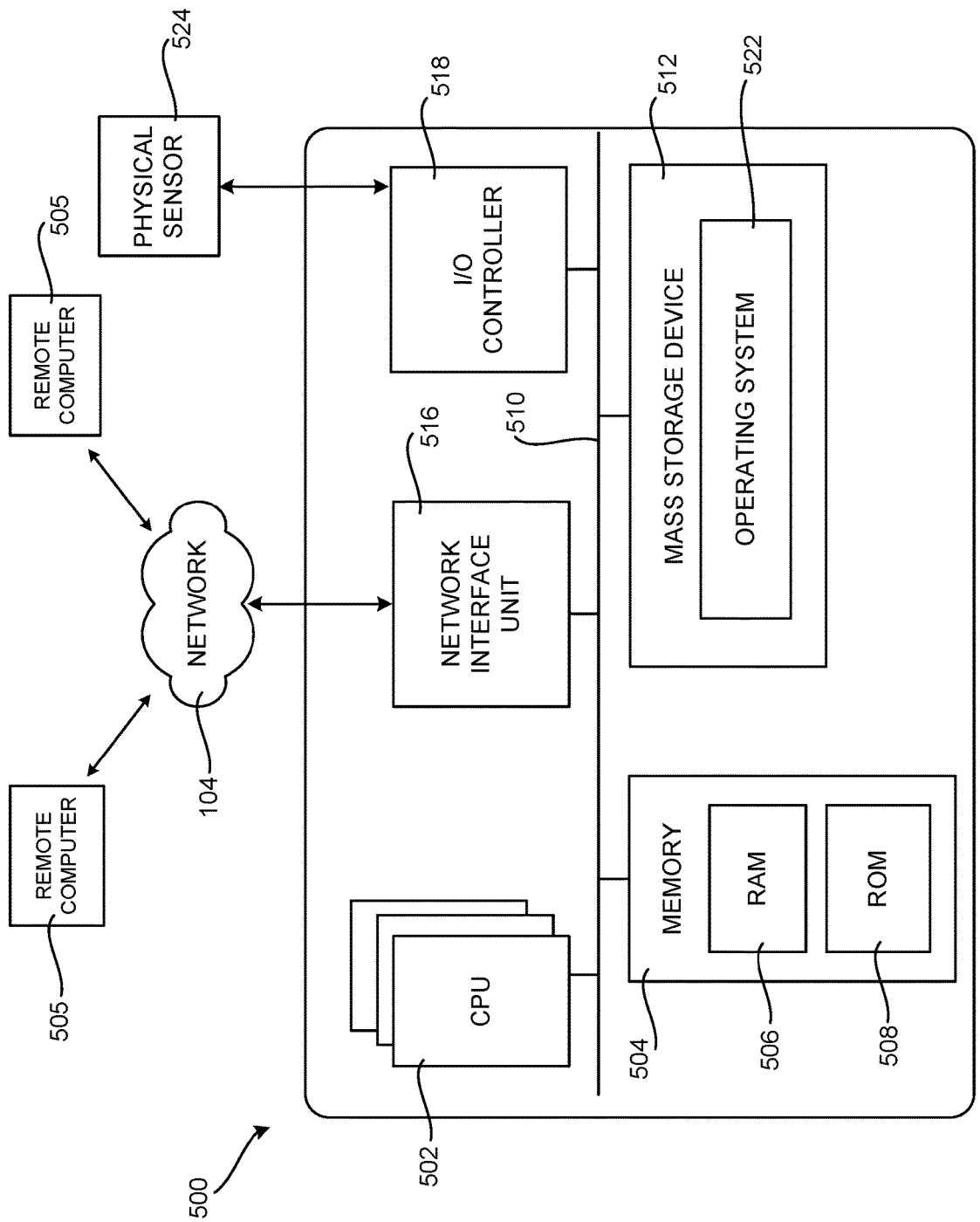
FIG. 5 is a computer architecture diagram showing an illustrative computer hardware and software architecture for a computing device that implements aspects of the technologies presented herein.

FIG. 5 is a computer architecture diagram showing an illustrative computer hardware and software architecture for a processing system 500 that implements the various technologies presented herein, in an embodiment. In particular, the architecture illustrated in FIG. 5 is utilized to implement a host 100 capable of providing aspects of the functionality disclosed herein, in an embodiment.

The processing system 500 illustrated in FIG. 5 includes a central processing unit 502 ("CPU"), a system memory 504, including a random-access memory 506 ("RAM") and a read-only memory ("ROM") 508, and a system bus 510 that couples the system memory 504 to the CPU 502. A firmware (not shown in FIG. 5) containing the basic routines that help to transfer information between elements within the processing system 500, such as during startup, is stored in the ROM 508 in an embodiment.

The processing system 500 further includes a mass storage device 512 for storing an operating system 522, such as the host OS 106, application programs, and other types of programs, some of which have been described herein. The mass storage device 512 is also configured to store other types of programs and data, in an embodiment.

The mass storage device 512 is connected to the CPU 502 through a mass storage controller (not shown in FIG. 5) connected to the bus 510. The mass storage device 512 and its associated computer readable media provide non-volatile storage for the processing system 500. Although the description of computer readable media contained herein refers to a mass storage device, such as a hard disk, Compact Disk Read-Only Memory ("CD-ROM") drive, Digital Versatile Disc-Read Only Memory ("DVD-ROM") drive, or Universal Serial Bus ("USB") storage key, computer readable media is any available computer-readable storage media or communication media that is accessible by the processing system 500.

Communication media includes computer-readable instructions, data structures, program modules, or other data in a modulated data signal such as a carrier wave or other transport mechanism and includes any delivery media. The term "modulated data signal" means a signal that has one or more of its characteristics changed or set in a manner so as to encode information in the signal. By way of example, communication media includes wired media such as a wired network or direct-wired connection, and wireless media such as acoustic, radio frequency, infrared and other wireless media. Combinations of the any of the above are also included within the scope of computer-readable media.

By way of example, computer-readable storage media includes volatile and non-volatile, removable and non-removable media implemented in any method or technology for storage of information such as computer readable instructions, data structures, program modules or other data, in an embodiment. For example, computer-readable storage media includes RAM, ROM, erasable programmable ROM ("EPROM"), electrically EPROM ("EEPROM"), flash memory or other solid-state memory technology, CD-ROM, DVD-ROM, HD-DVD, BLU-RAY®, or other optical storage, magnetic cassettes, magnetic tape, magnetic disk storage or other magnetic storage devices, or any other medium that stores the desired information and which is accessible to the processing system 500. For purposes of the claims, the phrase "computer-readable storage medium," and variations thereof, does not include waves or signals per se or communication media.

According to various configurations, the processing system 500 operates in a networked environment using logical connections to remote computers 505 through a network such as the network 104. The processing system 500 connects to the network 104 through a network interface unit 516 connected to the bus 510, in an embodiment. The network interface unit 516 might also be utilized to connect to other types of networks and remote computer systems, in embodiments.

The processing system 500 also includes an input/output controller 518 for receiving and processing input from a number of other devices, including a keyboard, mouse, touch input, an electronic stylus (none of which are shown in FIG. 5), or a physical sensor 524, such as a video camera, in an embodiment. Similarly, the input/output controller 518 provides output to a display screen or other type of output device (also not shown in FIG. 5), in an embodiment.

The software components described herein, when loaded into the CPU 502 and executed, transform the CPU 502 and the overall processing system 500 from a general-purpose computing device into a special-purpose processing system customized to facilitate the functionality presented herein. The CPU 502 is constructed from transistors or other discrete circuit elements, which individually or collectively assume any number of states, in an embodiment.

More specifically, the CPU 502 operates as a finite-state machine, in response to executable instructions contained within the software modules disclosed herein, in an embodiment. These computer-executable instructions transform the CPU 502 by specifying how the CPU 502 transitions between states, thereby transforming the transistors or other discrete hardware elements constituting the CPU 502.

Encoding the software modules presented herein also transforms the physical structure of the computer readable media presented herein, in an embodiment. The specific transformation of physical structure depends on various factors, in different implementations of this description. Examples of such factors include, the technology used to implement the computer readable media, whether the computer readable media is characterized as primary or secondary storage, and the like.

For example, if the computer readable media is implemented as semiconductor-based memory, the software disclosed herein is encoded on the computer readable media by transforming the physical state of the semiconductor memory, in an embodiment. For instance, the software transforms the state of transistors, capacitors, or other discrete circuit elements constituting the semiconductor memory, in an embodiment. The software transforms the physical state of such components in order to store data thereupon, in an embodiment.

As another example, the computer readable media disclosed herein is implemented using magnetic or optical technology, in an embodiment. In such implementations, the program components presented herein transform the physical state of magnetic or optical media, when the software is encoded therein. These transformations include altering the magnetic characteristics of particular locations within given magnetic media, in an embodiment. These transformations also include altering the physical features or characteristics of particular locations within given optical media, to change the optical characteristics of those locations, in an embodiment. Other transformations of physical media are possible without departing from the scope and spirit of the present description, with the foregoing examples provided only to facilitate this discussion.

Many types of physical transformations take place in the processing system 500 in order to store and execute the software components presented herein. The architecture shown in FIG. 5 for the processing system 500, or a similar architecture, is suitable for implementing other types of computing devices, including hand-held computers, video game devices, embedded computer systems, mobile devices such as smartphones, tablets, alternate reality ("AR"), mixed reality ("MR"), and virtual reality ("VR") devices, and other types of computing devices known to those skilled in the art. It is also contemplated that the processing system 500 might not include all of the components shown in FIG. 5, include other components that are not explicitly shown in FIG. 5, or an utilize an architecture completely different than that shown in FIG. 5, according to embodiments.

Figure 6:
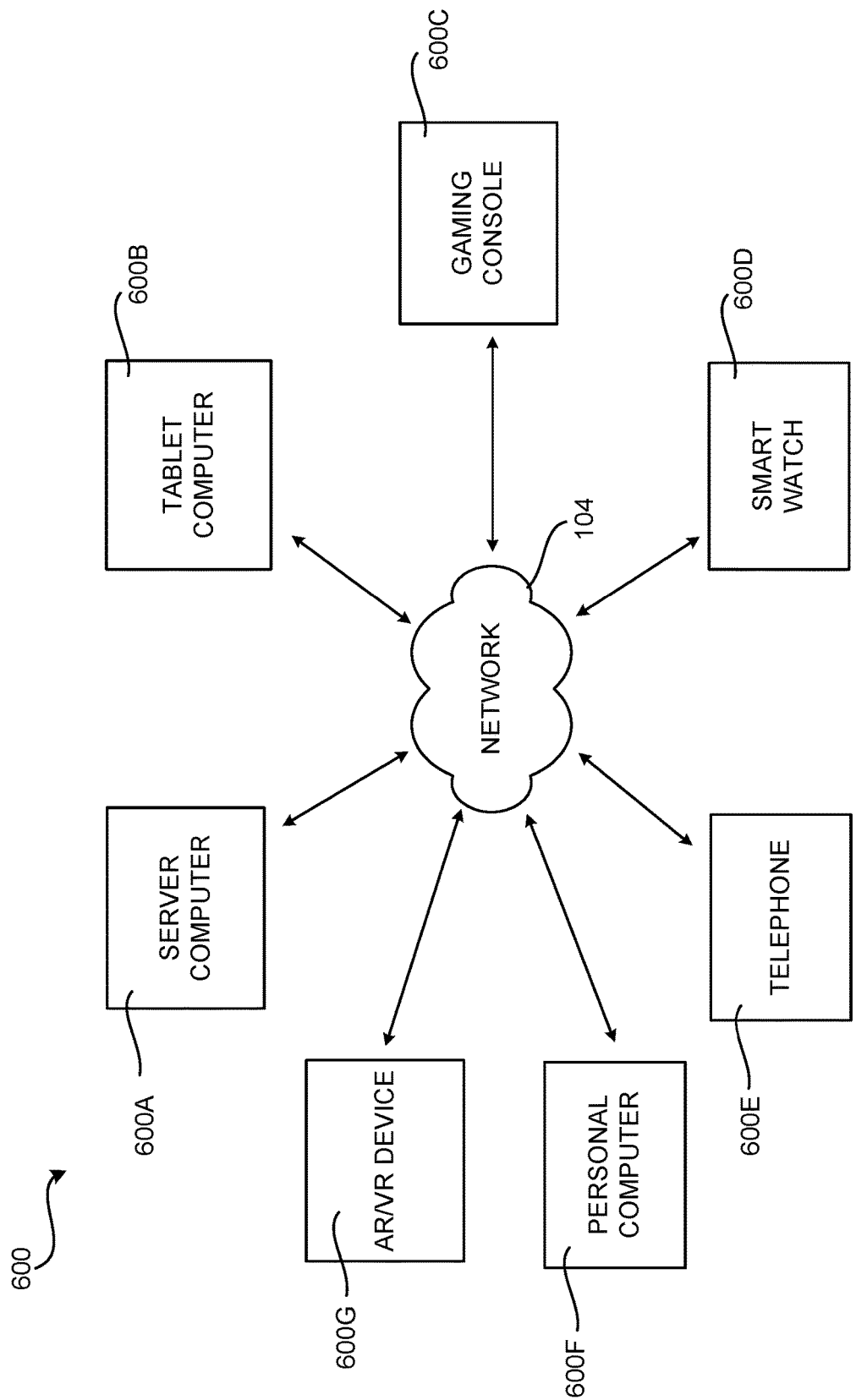
FIG. 6 is a network diagram illustrating an example distributed computing environment in which aspects of the disclosed technologies are implemented.

FIG. 6 is a network diagram illustrating a distributed network computing environment 600 in which aspects of the disclosed technologies are implemented, according to various embodiments presented herein. As shown in FIG. 6, one or more server computers 600A are interconnected via a network 104 (which might be either of, or a combination of, a fixed-wire or WLAN, wide-area network ("WAN"), intranet, extranet, peer-to-peer network, VPN, the internet, Bluetooth® communications network, proprietary low voltage communications network, or other communications network) with a number of client computing devices such as a tablet computer 600B, a gaming console 600C, a smart watch 600D, a telephone 600E, such as a smartphone, a personal computer 600F, and an AR/VR device 600G.

In a network environment in which the network 104 is the internet, for example, the server computer 600A is a dedicated server computer operable to process and communicate data to and from the client computing devices 600B-600G via any of a number of known protocols, such as, hypertext transfer protocol ("HTTP"), file transfer protocol ("FTP"), or simple object access protocol ("SOAP").

Additionally, the network computing environment 600 utilizes various data security protocols such as secured socket layer ("SSL") or pretty good privacy ("PGP"), in an embodiment. Each of the client computing devices 600B-600G is equipped with an OS, such as the host OS 106, operable to support one or more computing applications or terminal sessions such as a web browser (not shown in FIG. 6), graphical UI (not shown in FIG. 6), or a mobile desktop environment (not shown in FIG. 6) to gain access to the server computer 600A, in an embodiment.

The server computer 600A is communicatively coupled to other computing environments (not shown in FIG. 6) and receives data regarding a participating user's interactions, in an embodiment. In an illustrative operation, a user (not shown in FIG. 6) interacts with a computing application running on a client computing device 600B-600G to obtain desired data and/or perform other computing applications.

The data and/or computing applications is stored on the server 600A, or servers 600A, and communicated to cooperating users through the client computing devices 600B-600G over the network 104, in an embodiment. A participating user (not shown in FIG. 6) requests access to specific data and applications housed in whole or in part on the server computer 600A. These data are communicated between the client computing devices 600B-600G and the server computer 600A for processing and storage, in an embodiment.

The server computer 600A hosts computing applications, processes and applets for the generation, authentication, encryption, and communication of data and applications such as those described above with regard to FIGS. 1-4, and cooperates with other server computing environments (not shown in FIG. 6), third party service providers (not shown in FIG. 6), and network attached storage ("NAS") and storage area networks ("SAN") (also not shown in FIG. 6) to realize application/data transactions, in an embodiment.

The computing architecture shown in FIG. 5 and the distributed network computing environment shown in FIG.

6 have been simplified for ease of discussion. The computing architecture and the distributed computing network includes and utilizes many more computing components, devices, software programs, networking devices, and other components not specifically described herein, in an embodiment.

While the subject matter described above has been presented in the general context of computing devices implementing virtualized environments, such as VMs and containers, those skilled in the art will recognize that other implementations might be performed in combination with other types of computing devices, systems, and modules. Those skilled in the art will also appreciate that the subject matter described herein might be practiced with other computer system configurations, including hand-held devices, multiprocessor systems, microprocessor-based or programmable consumer electronics, computing or processing systems embedded in devices (such as wearable computing devices, automobiles, home automation, etc.), minicomputers, mainframe computers, and the like.

It is to be further understood that the operations of the routines and methods disclosed herein are not presented in any particular order and that performance of some or all of the operations in an alternative order, or orders, is possible and is contemplated. The operations have been presented in the demonstrated order for ease of description and illustration. Operations might be added, omitted, and/or performed simultaneously, without departing from the scope of the appended claims. The illustrated routines and methods might end at any time and need not be performed in their entireties.

Some or all operations of the methods, and/or substantially equivalent operations, are performed by execution of computer-readable instructions included on a computer-readable storage media, as defined herein, in an embodiment. The term "computer-readable instructions," and variants thereof, as used herein, is used expansively herein to include routines, applications, application modules, program modules, programs, program components, data structures, algorithms, and the like. Computer-readable instructions are implemented on various system configurations, including single-processor or multiprocessor systems, minicomputers, mainframe computers, personal computers, hand-held computing devices, microprocessor-based, programmable consumer electronics, combinations thereof, and the like.

The logical operations described herein are implemented (1) as a sequence of computer implemented acts or program modules running on a computing system and/or (2) as interconnected machine logic circuits or circuit modules within the computing system, according to an embodiment. The implementation is a matter of choice dependent on the performance and other requirements of the computing system. Accordingly, the logical operations described herein are referred to variously as states, operations, structural devices, acts, or modules. These operations, structural devices, acts, and modules are implemented in software, in firmware, in special purpose digital logic, and any combination thereof, according to embodiments.

For example, the operations illustrated in the sequence and flow diagrams and described herein are implemented in embodiments, at least in part, by modules implementing the features disclosed herein such as a dynamically linked library ("DLL"), a statically linked library, functionality produced by an API, a network service, a compiled program, an interpreted program, a script or any other executable set of instructions. Data is stored in a data structure in one or more memory components, in an embodiment. Data is retrieved from the data structure by addressing links or references to the data structure, in an embodiment.

The methods and routines described herein might be also implemented in many other ways. For example, the routines and methods are implemented, at least in part, by a processor of another remote computer or a local circuit, in an embodiment. In addition, one or more of the operations of the routines or methods are alternatively or additionally implemented, at least in part, by a chipset working alone or in conjunction with other software modules, in an embodiment.

The disclosure presented herein also encompasses the subject matter set forth in the following clauses:

Clause 1. A computer-implemented method, comprising: detecting creation of a host virtual private network (VPN) adapter on a host processing system providing a virtualized environment; responsive to detecting the creation of the host VPN adapter, causing a virtual network adapter to be created in the virtualized environment, and causing a guest operating system (OS) executing in the virtualized environment to create a guest VPN adapter; and inserting a VPN bridge between the guest VPN adapter and the virtual network adapter, the VPN bridge configured to add Ethernet frames to point-to-point protocol (PPP) packets received from the guest VPN adapter, and remove Ethernet frames from packets received from the virtual network adapter.

Clause 2. The computer-implemented method of clause 1, wherein a first software component executing on the host processing system detects the creation of the host VPN adapter on the host processing system and, in response thereto, generates a notification to a second software component executing in the virtualized environment.

Clause 3. The computer-implemented method of any of clauses 1 or 2, wherein the first software component is further configured to cause the virtual network adapter to be created in the virtualized environment.

Clause 4. The computer-implemented method of any of clauses 1-3, wherein the second software component executing in the virtualized environment receives the notification from the first software component and, in response thereto, causes the guest OS executing in the virtualized environment to create the guest VPN adapter.

Clause 5. The computer-implemented method of any of clauses 1-4, wherein the second software component executing in the virtualized environment is further configured to insert the VPN bridge between the guest VPN adapter and the virtual network adapter.

Clause 6. The computer-implemented method of any of clauses 1-6, wherein creation of the host VPN adapter is detected using one or more heuristics.

Clause 7. The computer-implemented method of any of clauses 1-7, wherein the virtual network adapter comprises a virtual Ethernet adapter.

Clause 8. A computer-readable storage medium having computer-executable instructions stored thereupon which, when executed by a host processing system, cause the host processing system to: detect a host virtual private network (VPN) adapter on the host processing system; create a virtual network adapter and a guest VPN adapter in a virtualized environment provided by the host processing system responsive to detecting the host VPN adapter; add Ethernet frames to point-to-point protocol (PPP) packets received from the guest VPN adapter; and remove Ethernet frames from packets received from the virtual network adapter.

Clause 9. The computer-readable storage medium of clause 8, wherein a first software component executing on the host processing system detects the host VPN adapter on the host processing system and, in response thereto, generates a notification to a second software component executing in the virtualized environment.

Clause 10. The computer-readable storage medium of any of clauses 8 or 9, wherein the first software component is further configured to cause the virtual network adapter to be created in the virtualized environment.

Clause 11. The computer-readable storage medium of any of clauses 8-10, wherein the second software component executing in the virtualized environment receives the notification from the first software component and, in response thereto, causes a guest operating system (OS) executing in the virtualized environment to create the guest VPN adapter.

Clause 12. The computer-readable storage medium of any of clauses 8-11, wherein the second software component executing in the virtualized environment is further configured to insert a VPN bridge between the guest VPN adapter and the virtual network adapter in response to the notification, the VPN bridge configured to add the Ethernet frames to the PPP packets received from the guest VPN adapter and remove the Ethernet frames from the packets received from the virtual network adapter.

Clause 13. The computer-readable storage medium of any of clauses 8-12, wherein the first software component is further configured to detect the host VPN adapter using one or more heuristics.

Clause 14. The computer-readable storage medium of any of clauses 8-13, wherein the virtual network adapter comprises a virtual Ethernet adapter.

Clause 15. A host processing system, comprising: a processor; and a computer-readable storage medium having computer-executable instructions stored thereupon that, when executed by the processing system, cause the processing system to: detect a host virtual private network (VPN) adapter on the host processing system; create a virtual network adapter and a guest VPN adapter in a virtualized environment provided by the host processing system responsive to detecting the host VPN adapter; add Ethernet frames to point-to-point protocol (PPP) packets received from the guest VPN adapter; and remove Ethernet frames from packets received from the virtual network adapter.

Clause 16. The processing system of clause 15, wherein a first software component executing on the host processing system detects the host VPN adapter on the host processing system and, in response thereto, generates a notification to a second software component executing in the virtualized environment.

Clause 17. The processing system of any of clauses 15 or 16, wherein the first software component is further configured to cause the virtual network adapter to be created in the virtualized environment.

Clause 18. The processing system of any of clauses 15-17, wherein the second software component executing in the virtualized environment receives the notification from the first software component and, in response thereto, causes a guest operating system (OS) executing in the virtualized environment to create the guest VPN adapter.

Clause 19. The processing system of any of clauses 15-18, wherein the second software component executing in the virtualized environment is further configured to insert a VPN bridge between the guest VPN adapter and the virtual network adapter in response to the notification, the VPN bridge configured to add the Ethernet frames to the PPP packets received from the guest VPN adapter and remove the Ethernet frames from the packets received from the virtual network adapter.

Clause 20. The processing system of any of clauses 15-19, wherein the first software component is further configured to detect the host VPN adapter using one or more heuristics.

Technologies for enabling VPN support in a virtualized environment have been disclosed herein. Although the subject matter presented herein has been described in language specific to computer structural features, methodological and transformative acts, specific computing machinery, and computer readable media, it is to be understood that the subject matter set forth in the appended claims is not necessarily limited to the specific features, acts, or media described herein. Rather, the specific features, acts and mediums are disclosed as example forms of implementing the claimed subject matter.

The subject matter described above is provided by way of illustration only and should not be construed as limiting. Various modifications and changes might be made to the subject matter described herein without following the example configurations and applications illustrated and described, and without departing from the scope of the present disclosure, which is set forth in the following claims.

What is claimed is:

1. A computer-implemented method, comprising:
causing a virtual network adapter to be created within a guest operating system (OS), wherein the virtual network adapter mirrors a host virtual private network (VPN) adapter;
causing the guest OS to create a guest VPN adapter within the guest OS; and
causing a VPN bridge to be inserted between the guest VPN adapter and the virtual network adapter within the guest OS, the VPN bridge configured to:
add Ethernet frames to point-to-point protocol (PPP) packets received from the guest VPN adapter, and
remove Ethernet frames from packets received from the virtual network adapter.

2. The computer-implemented method of claim 1, wherein a first software component executing on a host detects creation of the host VPN adapter on the host and, in response thereto, generates a notification to a second software component executing in the guest OS.

3. The computer-implemented method of claim 2, wherein the first software component is further configured to cause the virtual network adapter to be created within the guest OS.

4. The computer-implemented method of claim 3, wherein the second software component executing in the guest OS receives the notification from the first software component and, in response thereto, causes the guest OS executing in the guest OS to create the guest VPN adapter.

5. The computer-implemented method of claim 4, wherein the second software component executing in the guest OS is further configured to cause the VPN bridge to be inserted between the guest VPN adapter and the virtual network adapter.

6. The computer-implemented method of claim 2, wherein creation of the host VPN adapter is detected using one or more heuristics.

7. The computer-implemented method of claim 1, wherein the virtual network adapter comprises a virtual Ethernet adapter.

8. A computer-readable storage medium having computer-executable instructions stored thereupon which, when executed by a host processing system, cause the host processing system to:
  create a virtual network adapter and a guest virtual private network (VPN) adapter within a guest operating system (OS) provided by the host processing system, wherein the virtual network adapter mirrors a host virtual private network (VPN) adapter; and
  cause a VPN bridge to be inserted between the guest VPN adapter and the virtual network adapter within the guest OS, the VPN bridge configured to:
    add Ethernet frames to point-to-point protocol (PPP) packets received from the guest VPN adapter for communication to the virtual network adapter in the guest OS; and
    remove Ethernet frames from packets received from the virtual network adapter for communication to the guest VPN adapter in the guest OS.

9. The computer-readable storage medium of claim 8, wherein a first software component executing on the host processing system detects the host VPN adapter on the host processing system and, in response thereto, generates a notification to a second software component executing in the guest OS.

10. The computer-readable storage medium of claim 9, wherein the first software component is further configured to cause the virtual network adapter to be created within the guest OS.

11. The computer-readable storage medium of claim 9, wherein the second software component executing in the guest OS receives the notification from the first software component and, in response thereto, causes the guest OS to create the guest VPN adapter.

12. The computer-readable storage medium of claim 11, wherein the second software component executing in the guest OS is further configured to insert the VPN bridge between the guest VPN adapter and the virtual network adapter in response to the notification.

13. The computer-readable storage medium of claim 8, wherein the virtual network adapter comprises a virtual Ethernet adapter.

14. A host processing system, comprising:
  a processor; and
  a computer-readable storage medium having computer-executable instructions stored thereupon that, when executed by the processor, cause the processor to:
    create a virtual network adapter and a guest virtual private network (VPN) adapter within a guest operating system (OS) provided by the host processing system, wherein the virtual network adapter mirrors a host virtual private network (VPN) adapter; and
    cause a VPN bridge to be inserted between the guest VPN adapter and the virtual network adapter within the guest OS, the VPN bridge configured to:
      add Ethernet frames to point-to-point protocol (PPP) packets received from the guest VPN adapter for communication to the virtual network adapter in the guest OS; and
      remove Ethernet frames from packets received from the virtual network adapter for communication to the guest VPN adapter in the guest OS.

15. The host processing system of claim 14, wherein a first software component executing on the host processing system detects the host VPN adapter on the host processing system and, in response thereto, generates a notification to a second software component executing in the guest OS.

16. The host processing system of claim 15, wherein the first software component is further configured to cause the virtual network adapter to be created within the guest OS.

17. The computer-implemented method of claim 2, wherein a first implementation used by the first software component executed on the host and a second implementation used by the second software component executed in the guest OS are useable together via the host VPN adapter and the guest VPN adapter.

18. The computer-implemented method of claim 1, wherein the guest VPN adapter is created for program components executing on the guest OS to access a VPN.

19. The computer-implemented method of claim 1, wherein adding the Ethernet frames to the PPP packets received from the guest VPN adapter facilitates transmission of the PPP packets through the virtual network adapter, a guest-host communication channel, a hypervisor, and a flow steering engine.

20. The computer-implemented method of claim 1, further comprising creating a VPN connection for the guest OS by instantiating a VPN provider and instructing the guest OS to connect to the VPN provider to enable communications with a host OS associated with the host VPN adapter.

* * * * *